United States Patent [19]

Tinet

[11] 3,980,810

[45] Sept. 14, 1976

[54] DEVICE FOR LOCALLY POSITIONING A FLEXIBLE ROTATING DISC

[75] Inventor: Claude Tinet, Paris, France

[73] Assignee: Thomson-CSF, Paris, France

[22] Filed: Oct. 30, 1974

[21] Appl. No.: 519,189

Related U.S. Application Data

[63] Continuation of Ser. No. 321,304, Jan. 5, 1973, abandoned.

[30] Foreign Application Priority Data

Jan. 11, 1972    France .............................. 72.00789

[52] U.S. Cl. .................. 178/6.6 DD; 179/100.3 V; 360/102; 360/103
[51] Int. Cl.² ..................... H04N 5/76; G11B 17/32
[58] Field of Search ............... 360/86, 99, 102, 103; 178/6.6 R, 6.6 DD, 6.7 A; 179/100.3 V; 346/137

[56] References Cited
UNITED STATES PATENTS

| | | |
|---|---|---|
| 3,166,997 | 1/1965 | Barcia et al. ........................ 360/102 |
| 3,603,742 | 9/1971 | Schuller ............................. 360/102 |
| 3,678,482 | 7/1972 | Billabuala .......................... 360/103 |
| 3,818,506 | 6/1974 | Kelch et al. ........................ 360/102 |
| 3,842,197 | 10/1974 | Broussauld et al. ............. 178/6.7 A |

*Primary Examiner*—Raymond F. Cardillo, Jr.
*Attorney, Agent, or Firm*—Cushman, Darby & Cushman

[57] ABSTRACT

The present invention relates to a device designed to constrain the surface of a flexible disc, rotating about an axis, to pass very accurately through a predetermined point. This device is applicable to the read-out of video-signals, and especially of optical video signals, recorded upon a flexible plastic disc. According to the invention, the flexible disc slides on an air film over two fixed surfaces which stabilize its motion, and between two slippers which impose a fixed position upon it.

28 Claims, 6 Drawing Figures

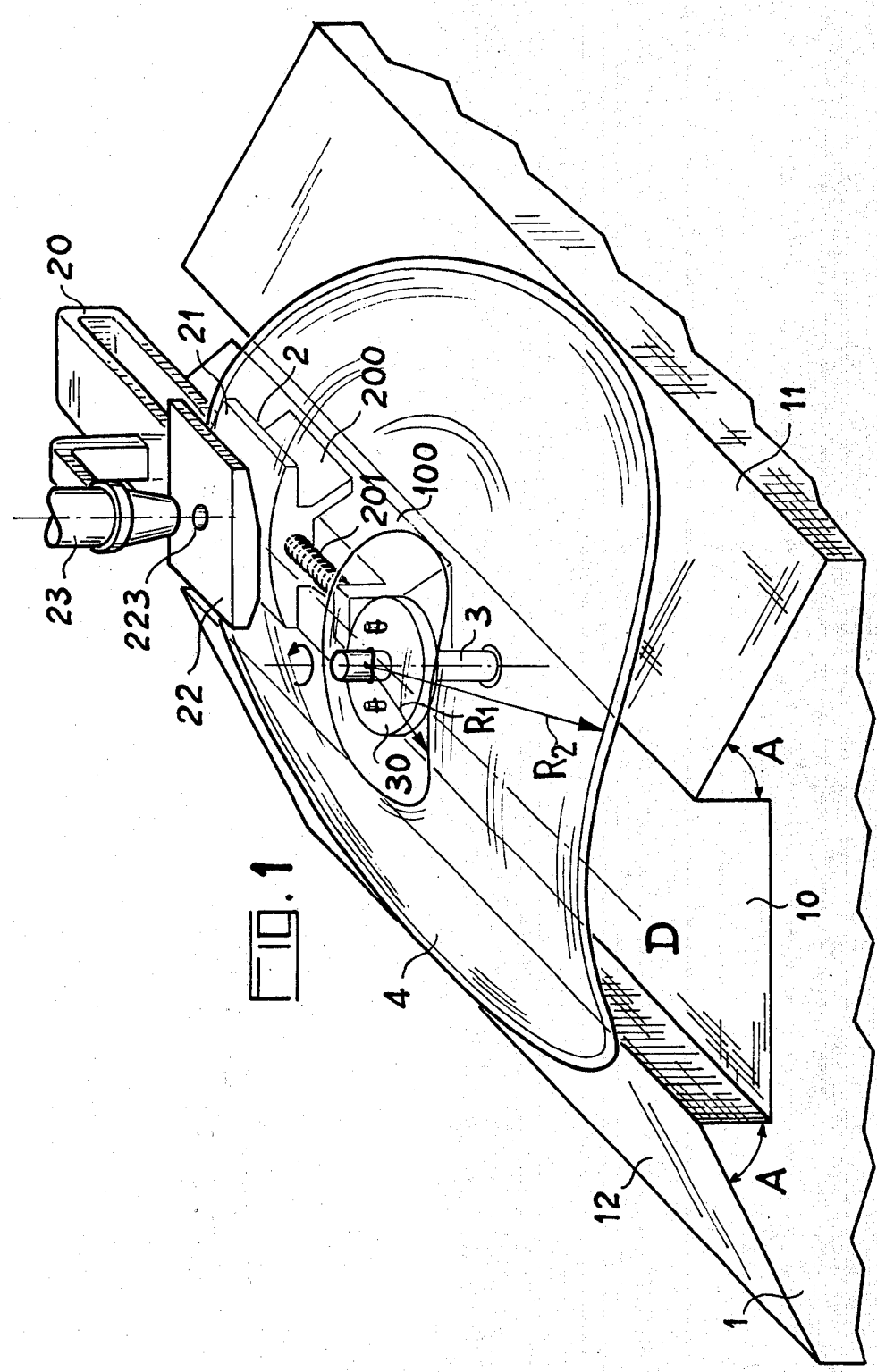

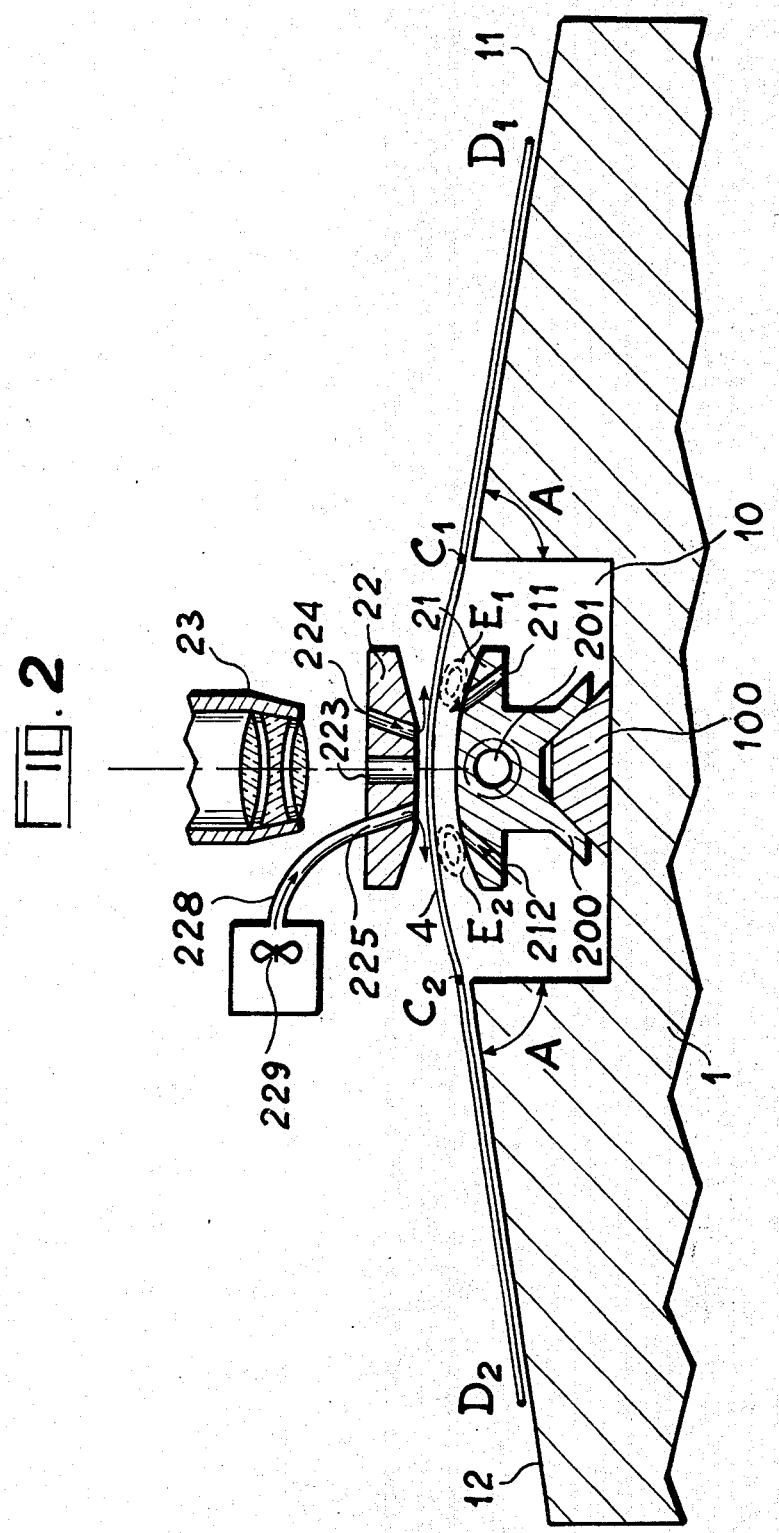

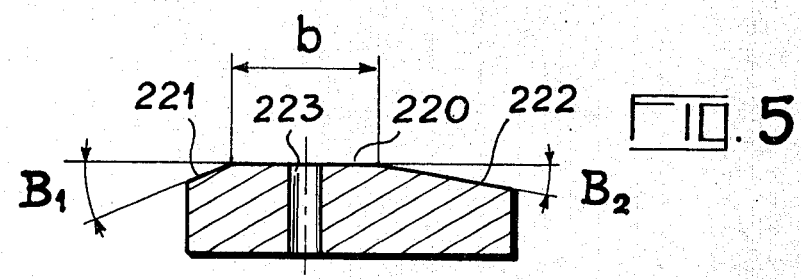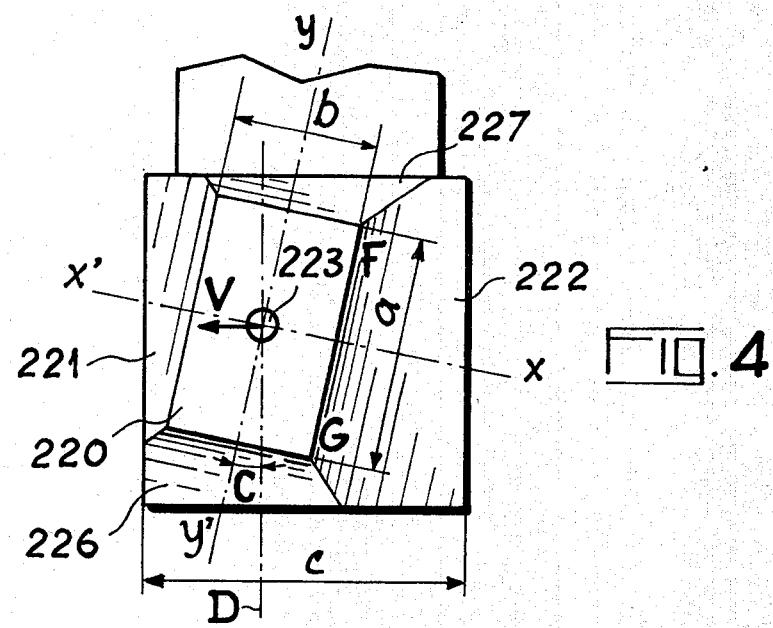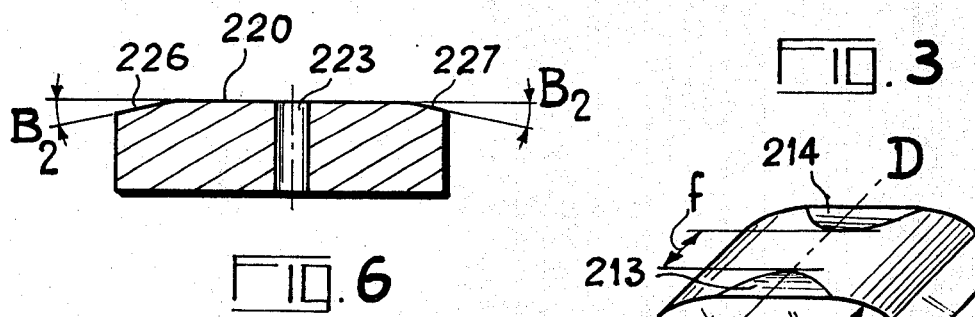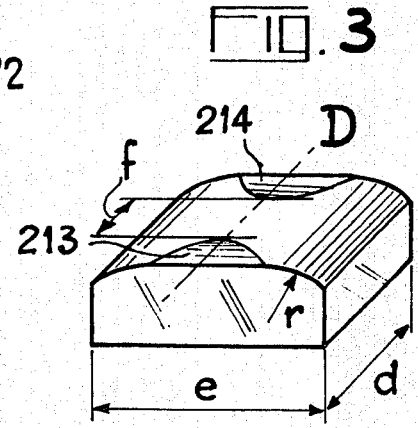

DEVICE FOR LOCALLY POSITIONING A FLEXIBLE ROTATING DISC

This is a continuation of application Ser. No. 321,304 filed Jan. 5, 1973, now abandoned.

The present invention relates to an aerodynamic device for stabilizing a flexible disc which is rotating about an axis. Said device is designed to force the surface of the disc to pass through a predetermined point which point may move along a straight radial line passing through the disc centre and perpendicular to its axis of rotation.

A device of this kind may, for example, be associated with an optical or magnetic read-out head, of the kind used in order to read information recorded upon the disc, without touching the disc itself; the higher the information density, the greater is the accuracy which is required in the position of the point read out, in relation to the read-out head. Now, the information densities which are currently achievable, being in the order of $10^7$ bit/cm$^2$, require an accuracy in the order of one micron in the position of the point in relation to the read-out head. It is clear, therefore, that the conventional solution, which consists in utilizing a rigid disc or a flexible disc arranged upon a rigid plate, if not impossible, is a best extremely expensive because of the mechanical precision which the assembly of the device must have.

To overcome this difficulty, it has been proposed that there be associated with a rigid rotating disc, a low-mass read-out device arranged on a slipper floating on an air bearing, at a constant distance from the disc. However, the not insignificant mass of the floating part means that there is inertia and this limits the speed of response to surface deformities; moreover, the need to impart a radial motion to the read-out head, so that it can read successive tracks, means that a delicate mechanical arrangement is required to maintain the slipper freedom of movement on the air cushion.

It has also been proposed that a flexible disc should be rotationally stabilized by arranging for it to spin at a sufficient speed above a flat plate: the air entering the neighbourhood of the motor spindle flows helically outwards to form a stabilizing bearing between the disc and the plate. This process has various drawbacks; the stabilized disc face is the one opposite the plate and it is difficult to form in the latter a radial slot to make it possible to effect readout, without disturbing the stabilizing airflow; the radial displacement of the read-out device must be such as to make it possible to maintain the distance between read-out head and disc strictly constant, and this is made the more difficult because the thickness of the air bearing decreases, in accordance with a non-linear law, from the center of the disc towards the edge; finally, that surface of the disc which is opposite the plate is only stabilized in an average way and the irregularities in the thickness of the disc locally destroy any precise stabilizing effect in relation to a read-out device located at the opposite side of the plate.

An improvement to this latter device consists in arranging for the disc to rotate not above a flat surface but above a dihedral body the curved ridge of which passes through the axis of rotation; in rotating, the disc acquires a kind of roof shape, the ridge of which remains parallel to the ridge of the dihedral body, so that the stresses thus developed in the stretched ridge part at that point eliminate the majority of the irregularities which are due to the crinkling encountered in a non-stressed disc. Here again, however, the effect is purely one of a mean or average stabilization and breaks down locally due to random variations in the thickness of the disc.

The device in accordance with the invention, whilst being as simple as possible in design, and inexpensive, makes it possible to overcome these various drawbacks. Taking the principle of sliding on an air film, it consists in imposing upon the disc, by virtue of the provision of two slip surfaces separated by a diametral channel containing the axis of rotation, a stable cylindrical shape, fixed in space and having a curvature in the region of the channel; it is then possible to associate the elastic stresses in the disc in said region of curvature, and the aerodynamic forces resulting from the action of two slippers moving in said channel and enclosing the disc between them in the curved region, in order to constrain one face thereof to pass through a fixed point in relation to one of said slippers, to which latter the read-out element can accordingly be attached.

The stabilization thus obtained applies to an elementary point on the surface carrying the information, and is thus insensitive either to crinkle formations in or local variations in thickness of the disc. As far as the translational motion of the read-out device and the associated slippers is concerned, the degree of mechanical accuracy required is entirely normal, since the position of the read-out device imposes the position of the disc, and not the other way round. Finally, despite the very high precision obtained in the positioning of the disc vis-a-vis the read-out device, in terms of the assembly of its components the device requires no more than ordinary machining accuracy.

For a better understanding of the invention, and to show how the same may be carried into effect, reference will be made to the drawings accompanying the ensuing description and in which:

FIG. 1 is an oblique perspective view of the device in accordance with the invention;

FIG. 2 is a sectional view of the device in accordance with the invention;

FIG. 3 illustrates the secondary slipper of the invention;

FIGS. 4, 5 and 6 illustrate the main slipper in accordance with the invention.

FIG. 1 illustrates an oblique perspective view of the stabilizing device in accordance with the invention. The device comprises a fixed plate 1 at the centre of which the drive spindle 3 is arranged, this being driven by a motor arranged beneath the plate and not shown in the figure. The spindle has a bearing section 30 upon which the flexible disc 4 is fixed. Two slip planes 11 and 12 are disposed symmetrically in relation to the drive spindle; they make identical angles A with said spindle and constitute the fixed part of the stabilizer elements proper. Between these two slip planes, a channel 10 is formed which extends uninterruptedly to either side of the drive spindle and whose length is sufficient for it to project at either end beyond the disc diameter.

Along the axis of this channel, and at one side only of the drive spindle, a bed 100 is arranged upon which there slides the moving part 2 of the stabilizer elements, which moving part can thus translate between the centre and the periphery of the disc, in a direction parallel to a straight line D; this straight line is defined as being contained in the plane of the bearing section 30, passing through the centre of the drive spindle and parallel to the imaginery line defined by the intersection of planes 11 and 12.

The moving part 2 is essentially comprised by two slippers 21 and 22, arranged at either side of the disc and connected by a bracket 20 carried by a slide 200 sliding on the bed 100. The length of the bracket is such that the centre of the slippers can reach the internal radius of the ring representing that part of the disc on which the information is carried. The moving part 2, which is translated by an endless screw 201, likewise carries the read-out element, illustrated in the figure as an optical element 23 and arranged above the top slipper through which, by means of the hole 223, it scans the disc.

Those faces of the slippers 21 and 22 which are opposite the disc are constituted by portions of cylindrical surfaces the generatrices of which are perpendicular to the axis of rotation although not necessarily parallel with one another. These portions of cylindrical surfaces are convex and their convexity is directed towards the disc. The minimum interval between the two slippers exceeds the thickness of the disc by only some few tens of microns, the top slipper, the main slipper in fact, being closest to the disc. The moving part is arranged so that the generatrix of the convex cylindrical face of the bottom slipper, the auxiliary slipper in fact, disposed opposite the disc, is located in the plane defined by the bearing portion 30 of the disc drive spindle; this is not a critical adjustment at all and an accuracy in the order of a tenth of a milimeter is entirely tolerable.

The dihedral angle 2A made by the two slip planes, is not at all critical either. Its value depends upon the thickness and diameter of the disc as well as upon the mechanical properties of the material. In the event that the axis of the disc is vertically disposed, and this is in no way a necessary condition, it has been experimentally found that the optimum value of 2A is a value equal to or slightly greater than the angle which the disc would make at rest, if arranged upon a horizontal ridge passing through its centre and defined by the straight line D.

FIG. 2, which illustrates a sectional view of the device, will help to understand the part played by the stabilizer elements; this section is taken perpendicularly to the straight line D at the level of the scanner orifice 223; the disc has been illustrated in the position which it occupies when rotating. To simplify explanation, the references designating the component elements of the device are the same in FIG. 2 as those used in FIG. 1.

As soon as the disc, driven by the spindle 3, reaches a sufficient speed, the parts opposite the slip planes 11 and 12 flatten against these latter and the influence of the aerodynamic force is generated by the rotation; they then slide over these faces on a thin air film which ensures that their motion involves absolutely no vibration. The disc thus adopts the shape of a cylindrical surface passing through the straight line D and symmetrical in relation to the plane defined by said straight line and the axis of rotation, the generatrix of this cylindrical shape being parallel to said straight line D. This cylindrical surface is parallel to the planes 11 and 12 in those parts $C_1D_1$ and $C_2D_2$ of the disc, which are opposite them; because of the angle made between the two faces, the disc exhibits a curved portion $C_1C_2$ above the channel, which forms a junction between the flat portions $C_1D_1$ and $C_2D_2$ located opposite the slip planes.

The function of the slip planes is thus a dual one; on the one hand, they have a smoothing effect upon the motion of the flexible disc and on the other hand, above the channel, they impart a certain curvature to the disc enabling the main slipper to perform its stabilizing role.

The stabilizing role of the main slipper is the predominant one. This slipper is necessarily disposed at the convex side of the curvature of the disc, which curvature is induced by the slip planes; moreover, it is arranged very close to the disc. In the neighbourhood of the radial ridge of the disc, defined by the straight line D, it creates an air bearing whose pressure is in large excess of the atmospheric pressure. Thus, in the neighbourhood of this ridge, the surface of the disc opposite the main slipper is essentially subjected to two forces which balance each other and ensure positional stability of this surface element in relation to the read-out device: the first is due to the over pressure which tends to displace the surface of the disc away from the main slipper and the second is the elastic force due to the curvature of the disc, which tends to make this surface adhere to the same slipper. The distance between the mutually opposite faces of disc and slipper being very small, the derivative of the variation in the air bearing pressure in relation to the variation in the thickness of said bearing, has a very high value; consequently, any variation in the elastic force, due to a local thickness variation or variation in the quality of the material, fails to produce any notable change in the thickness of the air bearing and thus in the position of said face of the disc in relation to the read-out device.

The auxiliary slipper, by design, is further away from the associated face of the disc and the pressure difference in relation to the atmosphere, created at the neighbourhood of the radial ridge, is small compared with that produced by the action of the main slipper; also, the variations in pressure difference between the concave face of the disc and the auxiliary slipper, which could result from local variations in thickness, have no effect upon the position of the convex face. On the other hand, in the regions marked $E_1$ and $E_2$ of FIG. 2, this auxiliary slipper produces over-pressure which reinforces the elastic forces tending to move the disc closer to the main slipper. It has been experimentally discovered that if the auxiliary slipper is discarded, it becomes difficult to approach the main slipper sufficiently close to the disc to achieve strict stabilizing.

It is possible, in accordance with the invention, to further improve the positional stability of the radial ridge, by artificially blowing external air through orifices such as those 224, 225 (FIG. 2) drilled through the thickness of the main slipper, and possibly orifices such as 211, 212 (FIG. 2) formed in the auxiliary slipper; a blower such as that 229, connected by the line 228 (FIG. 2) to the orifice 225, provides the requisite pressure.

The presence of the channel 10 is obviously made necessary by the need to radially displace the two slippers. However, it is essential that the channel should extend, along the straight line D, from one edge to the other of the disc; in this fashion, the half-channel opposite that within which the slippers move, is devoid of any air bearing effect; in this manner, there is thus no risk of the action of a restoring force which would appear in a region of the disc ridge diametrally opposite to the stabilizing region comprised between the two slippers, counteracting the self-stabilizing reaction which develops as soon as (due to an accidental variation in the height of the slippers during their displacement), the stabilized part of the disc, comprised between the two slippers, moves away from the ideal position shown by the straight line D.

Although in FIGS. 1 and 2, the slip planes 11 and 12 have been shown beneath the disc, in order to facilitate the fitting of the latter, it is equally possible to arrange them above the disc. Furthermore, there is nothing to prevent these planes from being replaced by portions of cylindrical surfaces having their generatrices parallel to D, provided that said surfaces make the same angle A as said planes, at the generatrix delimiting the channel.

In the foregoing, it has been assumed that the read-out element and the slippers with which it is associated, were mobile in relation to the disc. It is equally possible, in the case for example where the read-out element would be difficult to displace, to arrange for the slippers to be fixed in relation to the slip surfaces, and to design the spindle of the disc to translate along the axis of the channel. Then, a length sufficient to enable the disc to displace shall be given to the slip surfaces and the channel separating them, FIGS. 3, 4, 5 and 6 illustrate in accordance with the invention, preferred embodiments of the auxiliary and main slippers.

FIG. 3 illustrates the auxiliary slipper. It is constituted by a portions of cylindrical surface having a generatrix parallel to the straight line D and symmetrical in relation to a plane passing through D and through the axis of rotation. Its uniform radius of curvature $r$, is slightly less than the mean radius of curvature, above the channel, of the rotating disc, as the sectional view of FIG. 2 shows. Two end flats define planes 213 and 214 inclined at around 1°, on the generatrix of the cylinder, to prevent the disc from fouling the ends of the slipper and to reduce the length of the generatrices to the minimum dimension $f$.

FIGS. 4, 5 and 6 relate to the main slipper, FIG. 4 illustrating that face of said slipper which is opposite the disc, FIGS. 5 and 6 being sectional views in accordance with lines respectively marked XX' and YY' on FIG. 4.

It will be seen, from a consideration of FIGS. 4 and 5, that the portion of cylindrical surface forming the face opposite the disc, is made up of three planes, 220, 221 and 222. The plane 220 is perpendicular to the axis of rotation and contains the straight line D; the two planes 221 and 222, located at either side of the hole 223, make small angles, $B_1$ and $B_2$ respectively, ranging between 1° and 5°, with the aforesaid plane, $B_1$ being greater than $B_2$. The surface of the plane 220 has an area in the order of some few square centimeters.

In FIG. 4, the arrow V illustrates the direction of movement of the disc at the centre of the hole 223. The plane 222 thus constitutes the leading edge of the slipper; its surface is larger in area than that of the plane 221; the axis YY' is parallel to the intersection FG between the two planes 220 and 222, and makes an angle C with the straight line D. The value of this angle has a considerable influence upon the pressure of the air cushion; it has been experimentally determined that its optimum value is such that when the centre of the plane 220 is located at the arithmetic mean of the minimum and maximum radii $R_1$ and $R_2$ delimiting the ring upon which the information is carried, the extension of the side FG passes through the axis of rotation of the disc, or in other words:

$$tg\,C = \frac{b}{R_1 + R_2}$$

where $b$ represents the width, in the XX' direction, of the surface 220.

As FIGS. 4 and 6 show, two flats 226 and 227, derived from the plane 222 by rotations through ± 90° about an axis perpendicular to the face 220 and passing through the centre of said face, are also formed.

By way of a non-limitative embodiment, it is possible to stabilize the elementary area of the disc located opposite the orifice 223 in the main slipper, to within ± 1 $\mu$m, when:

the disc used is a flexible ethylene polyterephtalate disc measuring 30 cm in diameter and 125 $\mu$m in thickness, the ring carrying the information extending from $R_1 = 7.0$ cm and $R_2 = 14$cm, and the disc rotating at 1500 rpm;

the distance separating the two slippers, at the location of the scanning orifice is 160 microns;

the main slipper has the following characteristics;

| | |
|---|---|
| length (radial direction) of the face 220 | a = 40 mm |
| width of the face 200 | b = 25 mm |
| total width of the slipper | c = 60 mm |
| dihedral angle of the planes 220, 222 | $B_2$ = 1° |
| dihedral angle of the planes 220, 221 | $B_1$ = 5° | the secondary slipper has:

| | |
|---|---|
| a total length | d = 60 mm |
| an effective length | f = 20 mm |
| a width | e = 60 mm |
| and a radius of curvature | r = 200 mm |
| the angle made between the slip planes and the axis of rotation, is | A = 80° |
| the width of the central channel is | 70 mm. | the angle made between the slip planes and the axis of rotation, is: A = 80°
the width of the central channel is: 70 mm.

What is claimed is:
1. A positioning device for constraining one face of a flexible disc spinning about a rotation axis to pass through a predetermined point,
   said positioning device comprising rotating means for rotating said disc, at least a first, a second and a third surface and an elongated channel separating from one another said first and said second surface;
   said first and said second surface being fixed, said predetermined point being integral with said third surface and said rotation axis being located within said channel;
   rotation of said disc applying said disc in close vicinity of said first, second and third surfaces and generating a first, second and third air bearing interposed between said disc and respectively said first, second and third surfaces;
   said first and second surfaces being arranged for imposing a bend to said disc while rotating, said bend being located plumb above said channel;
   and said third surface facing the convex side of said bend.

2. A device as claimed in claim 1, wherein said first and second surfaces are both arranged on one side of said disc, said third surface being arranged on the other side of said disc.

3. A device as claimed in claim 1, wherein said predetermined point is substantially located on a fixed radial straight line, the centre of said disc being positioned on said radial straight line and said rotation axis being perpendicular to said radial straight line.

4. A device as claimed in claim 3, wherein said channel projects at either side of said disc and has a symmetry plane, said plane containing said radial straight line and said rotation axis.

5. A device as claimed in claim 3, wherein said first and second surfaces are portions of respectively a first and a second cylindrical surface, the generatrices of said surfaces being parallel to said radical straight line and the planes tangential to said surfaces along the edges delimiting said channel forming a dihedral angle other than zero.

6. A device as claimed in claim 5, wherein said first and second cylindrical surfaces are symmetrical in relation to said rotation axis.

7. A device as claimed in claim 5, wherein said first and second cylindrical surfaces are flat surfaces.

8. A device as claimed in claim 3, further including a main slipper, said main slipper comprising said third surface; said third surface being portion of a third cylindrical surface arranged upon the face of said slipper facing said disc; the generatrices of said third cylindrical surface being perpendicular to said rotation axis and the convex side of said third cylindrical surface being directed towards said disc.

9. A device as claimed in claim 8, wherein said third cylindrical surface is a prismatic surface, said prismatic surface having three flats, the first of said flats being perpendicular to said rotation axis and containing said radial straight line, the second and third of said flats being obliquely disposed at either side of said first flat.

10. A device as claimed in claim 8, further including an auxiliary slipper, said auxiliary slipper being integrally associated with said main slipper and comprising a portion of a fourth cylindrical surface, said fourth cylindrical surface facing said third surface and having its generatrices perpendicular to said rotation axis and its convexity directed towards said third surface; said main and auxiliary slippers being superimposed in a direction parallel to said rotation axis; rotation of said disc generating a fourth air bearing between said portion of a fourth cylindrical surface and said disc; and said disc sliding over said third and fourth air bearings between said portions of third and fourth cylindrical surfaces.

11. A device as claimed in claim 10, wherein a fixed bracket links said main and auxiliary slippers, said rotating means being translated along said radial straight line.

12. A device as claimed in claim 10, wherein a bracket links said main and auxiliary slippers, a slide being associated to said bracket in order to allow translation of said slippers along said radial straight line between said rotation axis and the periphery of said disc.

13. A device as claimed in claim 10, wherein said fourth cylindrical surface has a symmetry plane, said symmetry plane containing said radial straight line and said rotation axis; the radius of curvature of said fourth cylindrical surface being smaller than the radius of curvature of said bend.

14. A device as claimed in claim 10, wherein at least one of said slipper further comprises at least one orifice and means for feeding external air to said orifice, said orifice opening into said portion of a cylindrical surface for injecting said external air between said portion of a cylindrical surface and said disc.

15. A read-out system to read out information carried by a rotating flexible disc, including read-out means and a positioning device for constraining one face of said flexible disc spinning about a rotation axis to pass through a predetermined point;

said positioning device comprising rotating means for rotating said disc, at least a first, a second and a third surface and an elongated channel separating from one another said first and said second surface; said first and said second surface being fixed, said predetermined point being integral with said third surface, and said rotation axis being located within said channel; rotation of said disc applying said disc in close vicinity of said first, second and third surfaces and generating a first, second and third air bearing interposed between said disc and respectively said first, second and third surfaces; said first and second surfaces being arranged for imposing a bend to said disc while rotating, said bend being located plumb above said channel; and said third surface facing the convex side of said bend;

and said read-out means being integral with said third surface.

16. A read-out system as claimed in claim 15, wherein said first and second surfaces are both arranged on one side of said disc, said third surface being arranged on the other side of said disc.

17. A read-out system as claimed in claim 15, wherein said predetermined point is substantially located on a fixed radial straight line, the centre of said disc being positioned on said radial straight line and said rotation axis being perpendicular to said radial straight line.

18. A read-out system as claimed in claim 17, wherein said channel projects at either side of said disc and has a symetry plane, said plane containing said radial straight line and said rotation axis.

19. A read-out system as claimed in claim 17, wherein said portions of respectively a first and second surfaces are first and a second cylindrical surface, the generatrices of said surfaces being parallel to said radial straight line and the planes tangential to said surfaces along the edges delimiting said channel forming a dihedral angle other than zero.

20. A read-out system as claimed in claim 19, wherein said first and second cylindrical surfaces are flat surfaces.

21. A read-out system as claimed in claim 19, wherein said first and second cylindrical surfaces are symmetrical in relation to said rotation axis.

22. A read-out system a claimed in claim 17, further including a main slipper, said main slipper comprising said third surface; said third surface being portion of a third cylindrical surface arranged upon the face of said slipper facing said disc; the generatrices of said third cylindrical surface being perpendicular to said rotation axis and the convex side of said third cylindrical surface being directed towards said disc.

23. A read-out system as claimed in claim 22, wherein said third cylindrical surface is a prismatic surface, said prismatic surface having three flats, the first of said flats being perpendicular to said rotation axis and containing said radial straight line, the second and third of said flats being obliquely disposed at either side of said first flat.

24. A read-out system as claimed in claim 22, further including an auxiliary slipper, said auxiliary slipper being integrally associated with said main slipper and comprising a portion of a fourth cylindrical surface, said portion of fourth cylindrical surface facing said third surface; said main and auxiliary slippers being superimposed in a direction parallel to said rotation axis; rotation of said disc generating a fourth air bearing between said portion of a fourth cylindrical surface and said disc; and said disc sliding over said third and fourth air bearings between said portions of third and fourth cylindrical surfaces.

25. A read-out system as claimed in claim 24, wherein a fixed bracket links said main and auxiliary slippers, said means being translated along said radial straight line.

26. A read-out system as claimed in claim 24, wherein a bracket links said main and auxiliary slippers, a slide being associated to said bracket in order to allow translation of said slippers along said radial straight line between said rotation axis and the periphery of said disc.

27. A read-out system as claimed in claim 24, wherein said fourth cylindrical surface has a symmetry plane, said symmetry plane containing said radial straight line and said rotation axis; the radius of curvature of said fourth cylindrical surface being smaller than the radius of curvature of said bend.

28. A read-out system as claimed in claim 24, wherein at least one of said slippers further comprises at least one and means for feeding external air to said orifice, said orifice opening into said portion of a cylindrical surface for injecting said external air between said portion of a cylindrical surface and said disc.

* * * * *